March 5, 1957 C. H. BECKER 2,783,677

STEREOPHONIC SOUND SYSTEM AND METHOD

Filed June 29, 1953 4 Sheets-Sheet 1

INVENTOR
Carl H. Becker
BY
Fleher & Swain
ATTORNEYS

March 5, 1957 C. H. BECKER 2,783,677

STEREOPHONIC SOUND SYSTEM AND METHOD

Filed June 29, 1953 4 Sheets-Sheet 2

INVENTOR
Carl H. Becker
BY
Flehr & Swain
ATTORNEYS

INVENTOR
Carl H. Becker
BY
Flehr & Swain
ATTORNEYS

March 5, 1957 C. H. BECKER 2,783,677

STEREOPHONIC SOUND SYSTEM AND METHOD

Filed June 29, 1953 4 Sheets-Sheet 4

INVENTOR.
Carl H. Becker

BY

ATTORNEYS

United States Patent Office 2,783,677

Patented Mar. 5, 1957

2,783,677

STEREOPHONIC SOUND SYSTEM AND METHOD

Carl H. Becker, Los Altos, Calif., assignor to Ampex Electric Corporation, Redwood City, Calif., a corporation of California Application June 29, 1953, Serial No. 364,785

2 Claims. (Cl. 88—16.2)

This invention relates generally to stereophonic recording systems and methods, and is particularly applicable to the production of sound moving picture films.

In the production of sound moving pictures, particularly of the three dimensional type, it is desirable to effect synchronous recordation of sound stereophonically. Stereophonic recording is relatively complex compared to simple electrical recording where the pickup from one or more microphones is consolidated in a single amplifier channel and recorded as a single record. In stereophonic recording directivity lends realism when properly coordinated with moving picture images. For stereophonic recording it has been proposed to use two or three pickup microphones distributed horizontally adjacent the area from which acoustic events are originating, and containing the scene or objects to be photographed, and to connect the individual microphones to multi-channel amplifying and recording means. Fair stereophonic effects can be obtained with such an arrangement, assuming that the recordings are reproduced by use of multi-channel amplifying means and separate loud speakers which are disposed in a manner comparable to the disposition of the microphones. However, such a system is not well adapted to the moving picture industry, particularly because it does not provide a range of directivity for best reproduction in a theater or auditorium, and it does not provide the depth effects desired.

In general it is an object of the present invention to provide a system and method of the above character which is capable of producing the desired stereophonic recording with excellent directivity, and such as can be reproduced with excellent realism in a theater or auditorium.

Another object of the invention is to provide a system and method of the above character which is capable of producing sound depth effects, together with a desired directivity.

Further objects and features of the present invention will appear from the following description in which the preferred embodiment of the invention has been set forth in detail in conjunction with the accompanying drawing.

Referring to the drawing.

In accordance with the present invention microphones are arranged in at least one and preferably a plurality of "curtains," and these microphones are individually connected to multichannel amplifying and recording means, such as separate electronic amplifiers and a magnetic tape recorder provided with a plurality of magnetic recording heads. The tape drive of the magnetic recorder is synchronized with the drive for the camera. The microphones of a particular curtain are distributed with respect to a predetermined angular relationship. This relationship is maintained under a variety of conditions and adjustments to thereby maintain the desired directivity.

Figure 2:
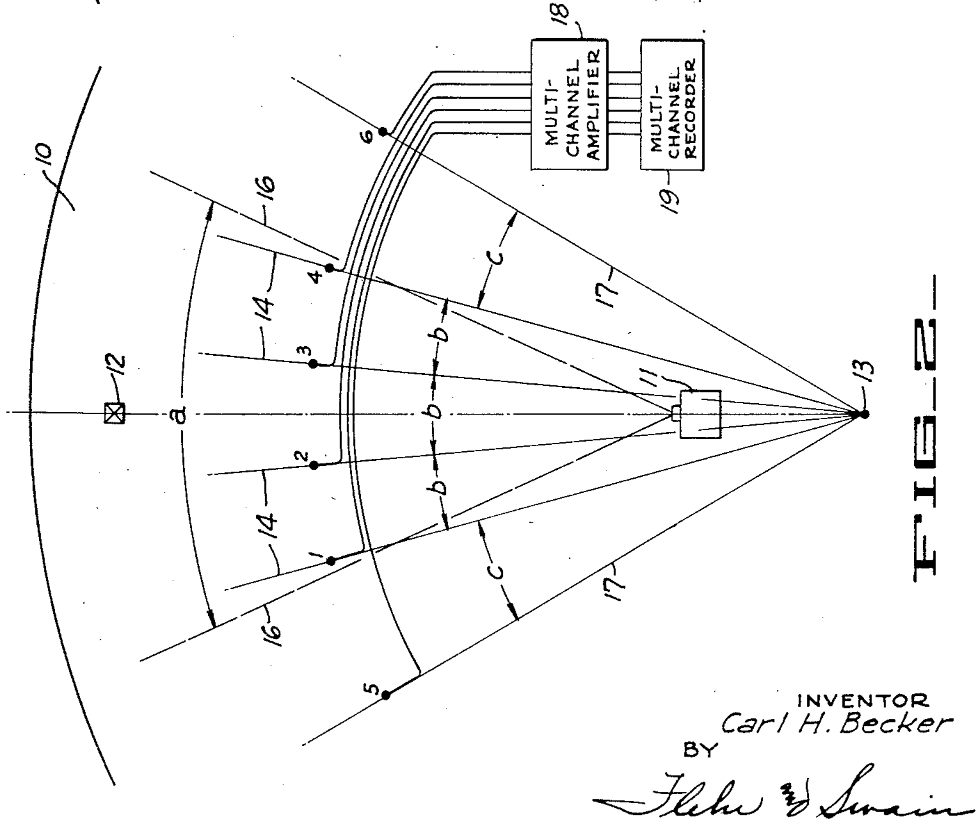
Figure 2 is a schematic view in plan illustrating one manner in which the microphones can be distributed with respect to stage and camera.

Referring first to the schematic arrangement illustrated in Figure 2, I have shown in plan a stage area 10 which is generally being viewed by the moving picture camera 11. A plurality of sound pickup microphones 1, 2, 3, and 4 are disposed between the camera and the object 12 being viewed, and are distributed laterally over a zone which can be referred to as a microphone curtain. Points on this zone are substantially equidistant from an assumed viewing center 13, which is located adjacent to the camera 11. Lines 14 have been extended from point 13 to the microphones 1, 2, 3, and 4. Dotted lines 16 represent the limits of the viewing angle of the camera lens, and the angle between these lines is indicated as angle *a*. Microphones 1 and 4 are located within the viewing range of the camera lens, but relatively close to the border lines 16, as for example a distance one-fourth the distance between the microphones. The angles *b* between the projected lines 14 are equal, and remain equal for a variety of recording conditions. It is desirable to use the additional microphones 5 and 6, which are located well beyond the boundary lines 16 of the viewing angle of the lens. The lateral spacing between microphones 1 and 5, and 4 and 6, preferably in substantially greater than the spacing between the microphones 1 to 4 inclusive. In other words when the lines 17 are projected from the microphones 5 and 6 to the center 13, the angles *c* are equal and substantially greater than angles *b*. Microphones 5 and 6 are desirable for picking up sounds from sources outside of the viewing angle of the camera, as for example sounds originating with objects approaching or receding from the area being photographed.

The microphones used are of the type having pronounced unidirectional characteristics. The axes of directivity are aligned with the projection lines 14 and 17, and directed away from the camera.

The characteristic directivity curve of each microphone, and the number of microphones employed, should be such as to minimize acoustic shadows or holes. In other words, assuming that the microphones remain in the fixed position illustrated in Figure 2, that the source of sound is from the object 12, and that this object is moving from one side of the stage to the other, there should be a gradual transition between microphones without pronounced changes in intensity.

In actual operation I have found it satisfactory to use four microphones distributed within the viewing angle of the lens, together with the two microphones 5 and 6. These microphones can be of the unidirectional type such as are now available.

While it is desirable for the microphone curtain to be a curved zone which is symmetrical about the center 13 it is possible to depart somewhat from this arrangement, as for example by placing the microphones 5 and 6 a somewhat greater distance from the center 13, or by locating all of the microphones in a curved zone which has a radius somewhat greater than the distance of the microphones 2 and 3 from the center 13.

In Figure 2 all of the microphones are shown separately connected to the multichannel amplifying means 18, which in turn is connected to the multichannel recorder 19. As previously mentioned, this recorder can be of the magnetic tape type, provided with a magnetic head having units corresponding in number to the number of channels being recorded. The magnetic tape drive means of this recorder can be connected to the camera by means of Selsyn motors, or by a direct connection, to operate synchronously with the camera.

For the particular positions of the microphones shown in solid lines in Figure 2, acoustical events in the space in front of the microphones are recorded with directivity and in proper coordinated relationship with the photographing of objects. Sounds emanating at different points on the stage are picked up and recorded with proper directivity and intensity, and proper components of directivity and sensitivity are recorded from moving objects or sound sources. Transition between the various microphones occurs without the distorting effect of acoustical shadows or holes.

Assuming that it is desired to shift the position of the microphones to positions farther away or closer to objects being viewed without movement of the camera, I accomplish this in such a manner as to maintain the microphones aligned with their respective projection lines 14 and 17. In this manner the angles *b* and *c* are maintained constant. In other words, the microphone curtain advances or retracts as a unit, with relative spacing between the microphones varying to maintain them aligned with the projection lines 14 and 17.

In some instances it is desirable to move the camera in a direction laterally of the stage. In other words as viewed in Figure 2, the camera may be moved to the left or to the right. Under such conditions I can move the microphones of the curtain together with lateral movement of the camera. In other words, the curtain is shifted as a unit as by mechanically attaching it to the camera mounting.

Assuming that it is desired to move the camera forwardly or rearwardly with respect to the object or area being photographed, without changing the focal length of the camera lens, then again the microphone curtain can be moved in coordination with movements of the camera. This serves to maintain an angular relationship corresponding to that described with respect to Figure 2.

In the event the camera is turned about a vertical axis, then the microphone curtain can again be shifted in coordination with turning movements of the camera, whereby all of the microphones maintain the same relationship with respect to the viewing angle of the camera lens.

In the event the focal length of the camera is changed, to change the angle *a*, the lateral spacing between the microphones may be changed, accordingly, thereby effecting corresponding changes in the angles *b* and *c*. Assuming that the focal length of the camera lens is changed so that the angle *a* is greater, then the spacing between the microphones can be correspondingly increased.

Figure 3:
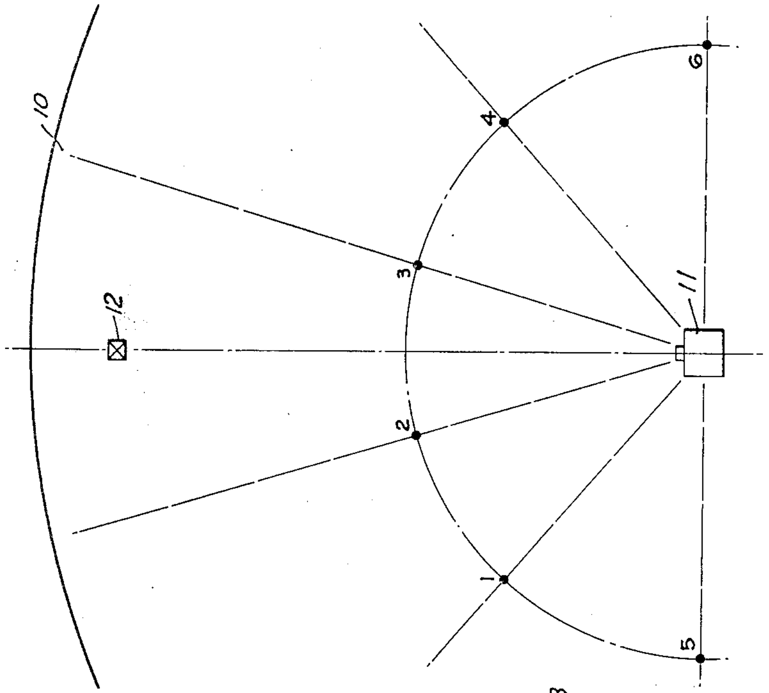
Figure 3 is a view like Figure 2 but illustrating another distribution of microphones.

In Figure 3 I have shown an arrangement similar to Figure 2, but with the microphones distributed over about 180° to obtain expanded directional effects.

Preferably I employ more than one microphone curtain in order to obtain depth effects. Such an arrangement is represented schematically in Figure 4. In this instance I provide one microphone curtain A, located substantially the same as in Figure 2, together with a second microphone curtain B. The microphones 1 to 6 of curtain B are aligned with projection lines 14 and 17, to maintain the same angular relation as the microphones for curtain A. Curtain B can be located relatively close to the orchestra or other source of background sound, while curtain A can remain in a location adjacent the camera. Each microphone of curtain A is shown connected to the corresponding microphone of curtain B, through a suitable mixer 21. The mixers can be arranged for both individual and gang operation as illustrated. The leads from the mixers are shown connected to the multi-channel amplifying means 22, which in turn connects with the multi-channel recording means 23. By means of the mixing devices 21, two corresponding microphones, as for example microphones 1 can be made to contribute equally to the input of the amplifying means, or adjustment can be made so that one microphone or the other predominates. By means of the gang control of all of the mixing devices either one of the two curtains can be made to predominate whereby under certain conditions the curtain B may supply only reverberatory background noises or other special sound effects, with the curtain A being the primary factor in recording, or the intensity of the input from curtain B can be raised to a point where it equals or is even greater than the input from curtain A.

Generally it is satisfactory to permit curtain B to remain substantially fixed, with its individual microphones aligned on the projection lines 14 and 17, for the optimum position of the camera. Thus only curtain A will be subject to shifts as previously described with respect to Figure 2.

Figure 1:
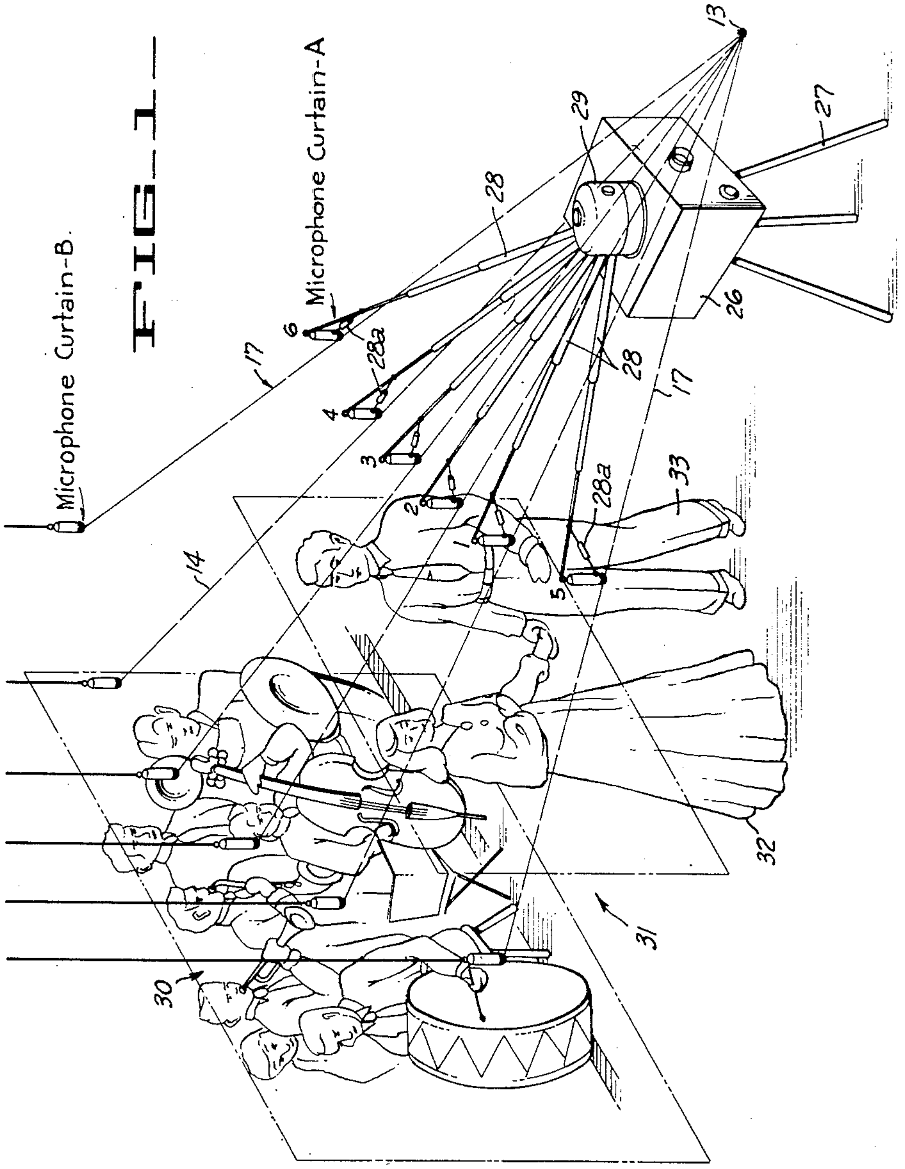
Fig. 1 is a perspective view schematically illustrating my method and system.

It will be evident that various types of equipment can be used to carry out the method described above. In Figure 1 I have shown a camera 26 which can be supported by a mobile device or a tripod 27. The microphones of curtain A are carried by the booms 28. All of these booms have a common mounting 29 to the camera, or to supporting means with respect to which the camera is fixed. The individual booms can be made in telescopic sections as illustrated and can, for example, be subject to operation by application of hydraulic pressure, whereby the booms can be extended or retracted as desired. Note that all of the microphones are supported at a height such as to be outside of the viewing angle of the camera lens. Preferably each microphone is attached to tilting means **28*a* whereby each microphone can be tilted in a vertical plane coincident with its corresponding extension line. All of the tilting means can be both individually and simultaneously adjustable, to thereby direct the axis of each microphone field in a downwardly inclined direction and toward an area over which acoustic events may pass. An orchestra 30 is shown as representative of a background source of sound for the stage 31 when the actors 32 and 33** are in the foreground. The microphones in curtain B are located adjacent the background and have the same relationship with respect to the microphones of curtain A, as previously described with reference to Figure 4.

All of the microphones are connected to mixing and multi-channel amplifying and recording means as previously described. As the camera 26 is moved with respect to the stage, the microphones of curtain A will be moved accordingly. As the microphones are advanced away from the camera 26, the angularity previously described is maintained. When the focal length of the camera is altered either by adjustment of a lens system of adjustable focal length, or by the exchange of lenses, the angles between the booms may be adjusted as previously described with reference to Figure 2. While mechanism can be provided to effect changes in the distribution of microphones in curtain B, it is satisfactory in many instances to support these microphones by any suitable means (not shown), such as a boom extending laterally across the stage.

Figures 4, 5:
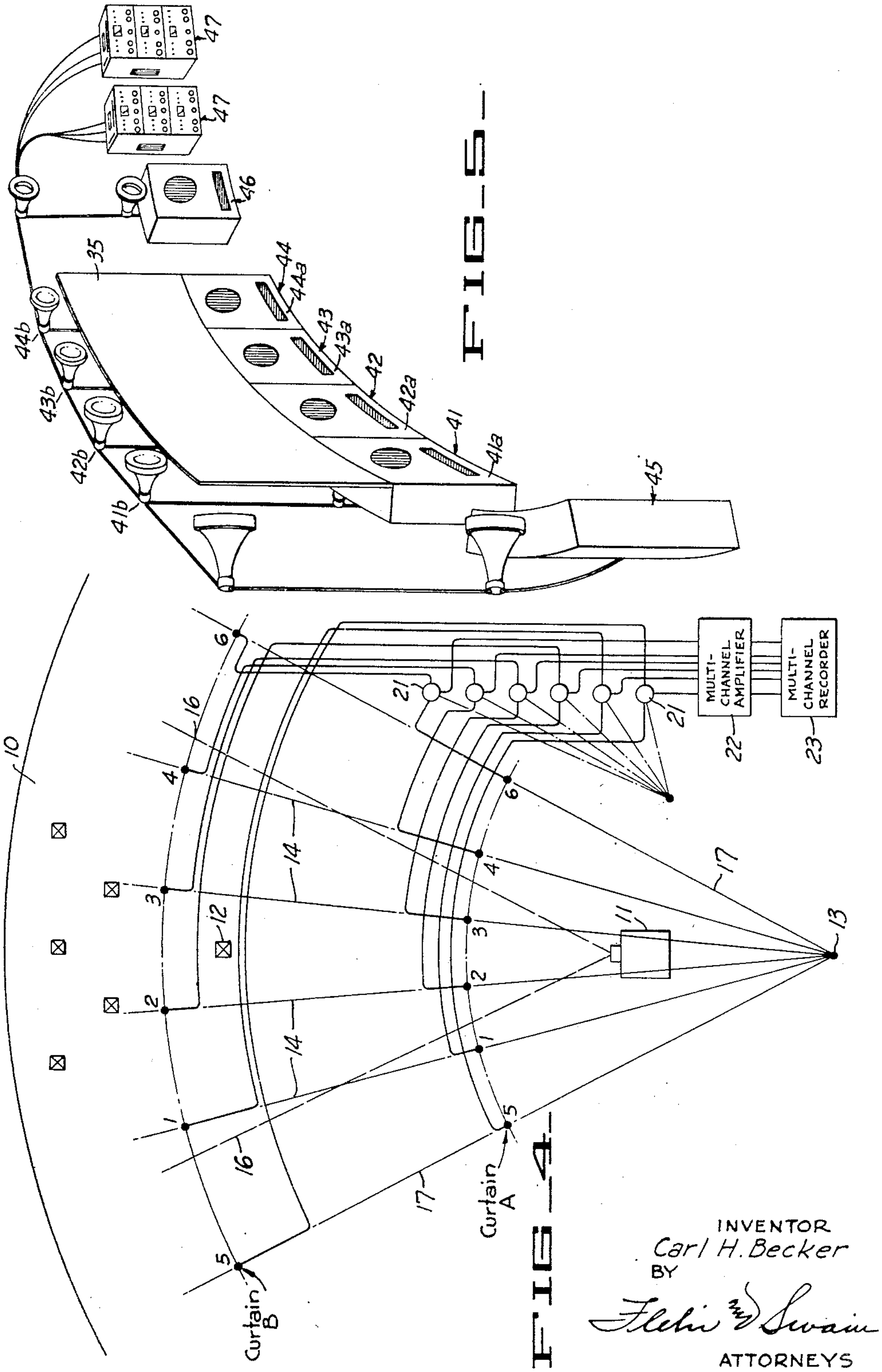
Figure 4 is a view like Figure 2 but illustrating the use of two microphone curtains.
Figure 5 is a perspective view schematically showing a grouping of loud speakers for stereophonic reproduction.

Figure 5 schematically illustrates an arrangement for reproduction. The moving picture is projected upon the curved screen 35. The loud speaker units 41–46 are grouped relative to the screen with the same relative positioning as the corresponding microphones 1 to 6 inclusive. The speaker units 41–44 can each include speaker assemblies **42*a*, *b*–35*a*, *b* inclusive which are located below and above the screen. The loud speaker units are energized by the outputs of the multichannel amplifiers 47** which have their inputs connected to a magnetic reproducing head. The magnetic tape is driven synchronously with the film projector (not shown).

Figure 6:
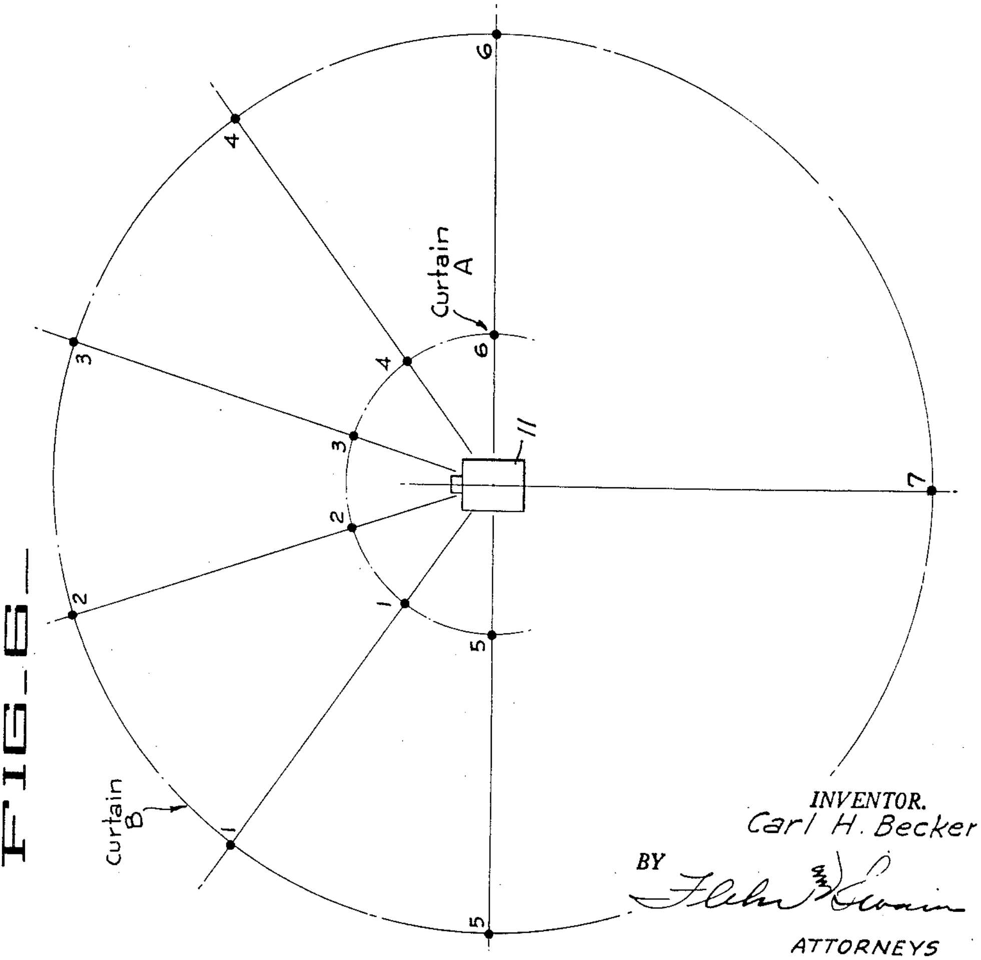
Figure 6 is a view like Figure 4 but showing a distribution of microphones for 360° effects.

Figure 6 shows an arrangement for 360° directivity. In this instance it is assumed that the microphones of curtain A are attached to the camera support or mounting, and they are distributed over 180° as illustrated. Microphones 1 to 6 of curtain B are likewise distributed over 180° and with the azimuth angularity previously described. An additional microphone 7 of curtain B can be connected to a separate recording channel or may be bridged with microphones 5 and 6. The loud speakers used for reproduction can be distributed in the same general manner as the microphones 1–6 inclusive, and an additional loud speaker at the rear of the auditorium, corresponding to microphone 7.

I claim:

1. In a method for stereophonic recordation of sound synchronously with operation of a motion picture camera to photographically record visual events and objects on a staging area, the method of employing a plurality of microphones together with a multichannel recording equipment, the steps of locating microphones in at least two horizontally spaced positions to form in effect first and second microphone curtains each extending in a general horizontal direction, the second one of said curtains being located near the rear of the staging area and the first one being located adjacent the camera, the location of the microphones in said curtains being such that lines extended from an assumed visual center through each microphone are horizontally displaced by substantially equal azimuth angles, said lines in plan being symmetrically distributed within the viewing angle of the camera lens, locating the microphones of the first curtain substantially coincident with said lines, whereby one microphone of the first curtain corresponds with the microphone on the same projected line in the second curtain, and forming a single record of the sound pickup of two corresponding aligned microphones.

2. In a method as in claim 1 in which the relative intensity of the sound pickup from two corresponding microphones is adjusted for forming a single sound record.

References Cited in the file of this patent

UNITED STATES PATENTS

| | | |
|---|---|---|
| 1,589,139 | Foley | June 15, 1926 |
| 1,645,295 | Rogers | Oct. 11, 1927 |
| 1,765,735 | Phinney | June 24, 1930 |
| 1,781,550 | Kwartin | Nov. 11, 1930 |
| 2,101,121 | Wixon | Dec. 7, 1937 |
| 2,122,010 | Savage et al. | June 28, 1938 |
| 2,343,471 | Nixon | Mar. 7, 1944 |